No. 734,608. PATENTED JULY 28, 1903.
H. H. PORTER, Jr.
TRACTION WHEEL.
APPLICATION FILED DEC. 24, 1901.
NO MODEL.
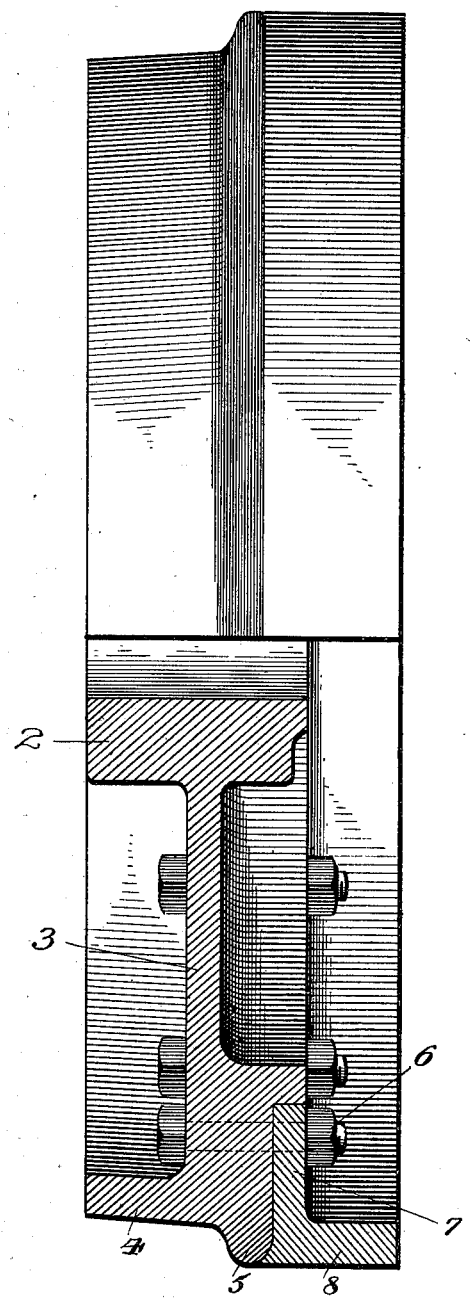
Witnesses:
Chas. E. Gaylord.
John Enders Jr.
Inventor:
Henry H. Porter Jr.
By Paul Synnestvedt
Atty.

No. 734,608.                                    Patented July 28, 1903.

UNITED STATES PATENT OFFICE.

HENRY H. PORTER, JR., OF CHICAGO, ILLINOIS, ASSIGNOR TO SWANITZ COMPANY, OF CHICAGO, ILLINOIS, A CORPORATION OF DELAWARE.

TRACTION-WHEEL.

SPECIFICATION forming part of Letters Patent No. 734,608, dated July 28, 1903.

Application filed December 24, 1901. Serial No. 87,125. (No model.)

*To all whom it may concern:*

Be it known that I, HENRY H. PORTER, Jr., a citizen of the United States of America, and a resident of Chicago, in the county of Cook and State of Illinois, have invented certain new and useful Improvements in Traction-Wheels, (Case No. 3,) of which the following, taken in connection with the accompanying drawing, is a specification.

This invention has reference to the provision of a wheel having two tread portions, one constructed to run upon a smooth surface or floor and the other, flanged or otherwise, capable of running upon a rail or ordinary railroad-track.

One object of my invention is to provide a wheel of the type specified which can be used in conjunction with merchandise-transfer cars or trucks for service upon a traction-floor in conjunction with some railroad-track connected with said traction-floor, whereby goods may be taken from any point adjacent to said floor by means of said track or rail to any other point which may be desired; but I do not wish to be understood as limiting my claims in this regard.

In carrying out my invention I have provided a construction which I have shown in preferred form in the accompanying drawing, in which—

2 is a wheel, 3 the web portion of the wheel, and 4 the rail-tread portion thereof provided with a flange 5, preferably of usual construction. To the side of the wheel, by means of bolts 6 or other suitable attaching devices, I have secured a rim 7, formed with a tread portion 8, which constitutes, in effect, an expansion or a widening of the crown of the flange 5, so as to make a suitable bearing for use on a traction-floor or other smooth surface. The rim 7 may be made removable in case it should be desired at any time to take it off from the wheel 2 and, if desired, can be then suspended under the truck, so as to clear the track.

Having thus described my invention, what I claim as new, and desire to secure by Letters Patent, is—

1. A car-wheel provided with a tread-surface, a guard-flange to engage the rail, and an extended floor-tread level with said flange and placed on the side thereof, and fitting the contour of said flange.

2. A car-wheel having a rail-tread, a guard-flange for the rail, a second tread-surface in line with said flange and supported against the same and against an abutment upon the wheel-rim.

3. A wheel having a tread portion constructed to run on a rail, a flange to guide it on said rail, and a removable tread portion, attached to said wheel.

In witness whereof I have hereunto set my hand in the presence of two subscribing witnesses.

HENRY H. PORTER, JR.

In presence of—
PAUL CARPENTER,
H. W. SMALLEY.